No. 694,012. Patented Feb. 25, 1902.
W. P. GURR.
TIME RECORDER.
(Application filed Mar. 19, 1901.)
(No Model.) 8 Sheets—Sheet 2.

Witnesses

Inventor
William P. Gurr.
By his Attorneys
Williamson & Merchant

No. 694,012. Patented Feb. 25, 1902.
W. P. GURR.
TIME RECORDER.
(Application filed Mar. 19, 1901.)
(No Model.) 8 Sheets—Sheet 3.

Fig. 5.

Witnesses.

Inventor.
William P. Gurr.
By his Attorneys.

No. 694,012. Patented Feb. 25, 1902.
W. P. GURR.
TIME RECORDER.
(Application filed Mar. 19, 1901.)
(No Model.) 8 Sheets—Sheet 4.

Witnesses.
C. H. Turner.
Harry Kilgour

Inventor.
William P. Gurr.
By his Attorneys.
Williamson & Merchant

No. 694,012.  
W. P. GURR.  
TIME RECORDER.  
(Application filed Mar. 19, 1901.)  
(No Model.)  
Patented Feb. 25, 1902.  
8 Sheets—Sheet 6.

Witnesses.

Inventor.  
William P. Gurr.  
By his Attorneys.

No. 694,012. Patented Feb. 25, 1902.
W. P. GURR.
TIME RECORDER.
(Application filed Mar. 19, 1901.)
(No Model.) 8 Sheets—Sheet 7.

Fig. 10.

Witnesses.
C. H. Turner.
Harry Kilgore

Inventor.
William P. Gurr.
By his Attorneys.
Williamson & Merchant

UNITED STATES PATENT OFFICE.

WILLIAM P. GURR, OF MINNEAPOLIS, MINNESOTA.

TIME-RECORDER.

SPECIFICATION forming part of Letters Patent No. 694,012, dated February 25, 1902.

Application filed March 19, 1901. Serial No. 51,854. (No model.)

*To all whom it may concern:*

Be it known that I, WILLIAM P. GURR, a citizen of the United States, residing at Minneapolis, in the county of Hennepin and State of Minnesota, have invented certain new and useful Improvements in Time-Recorders; and I do hereby declare the following to be a full, clear, and exact description of the invention, such as will enable others skilled in the art to which it appertains to make and use the same.

My present invention relates to time-recorders for recording the time of employees; and it has for its object to improve the same in the several particulars hereinafter noted.

The invention consists of the novel devices and combinations of devices hereinafter described, and defined in the claims.

A machine constructed in accordance with my invention and illustrating what I consider the preferred form of the same is shown in the accompanying drawings. The construction of this machine may be briefly forecast by the following statement: The platen, which is the relatively fixed member, is in the form of a long flat surface, and running lengthwise thereof are carriage-guides, over which is mounted to move a traveling carriage. This traveling carriage is given its traveling movement from a spring-motor which is carried thereby and the movements of which are controlled by a clockwork or timed escapement mechanism. This traveling carriage is provided with a plurality of independently-operative markers which, by a suitable key mechanism, are adapted to be thrown into and out of action at will. A graduated recording-strip is suitably secured on the face of the platen, and immediately under the same is placed a strip of carbon-paper. Hence the strip-engaging points of the markers are formed of metal or other hard material and are made quite sharp. The marking-points of the markers are projected slightly to the rear of the carriage, so that they may always be seen. With this arrangement the complete time-record of all of the employees who use the machine is always exposed to view. Provision is made whereby the machine may be set to run continuously throughout the twenty-four hours of several consecutive days. Means is also provided whereby at will the machine may be set so that it will automatically run for twelve hours and remain idle for twelve hours of each of the consecutive days of the week, more or less, and this action may take place without stopping the clockwork or hands of the clock.

Many other novel features of construction will appear in the following detail description.

The invention is illustrated in the accompanying drawings, wherein like characters indicate like parts throughout the several views.

Fig. 5 is a horizontal section, taken approximately on the line $x^5\ x^5$ of Fig. 4, some parts being removed.

The numeral 1 indicates a flat bed-plate, the central portion of which is shown as slightly raised to afford a long flat platen 2. (See particularly Figs. 2, 5, and 6.)

Figure 6:
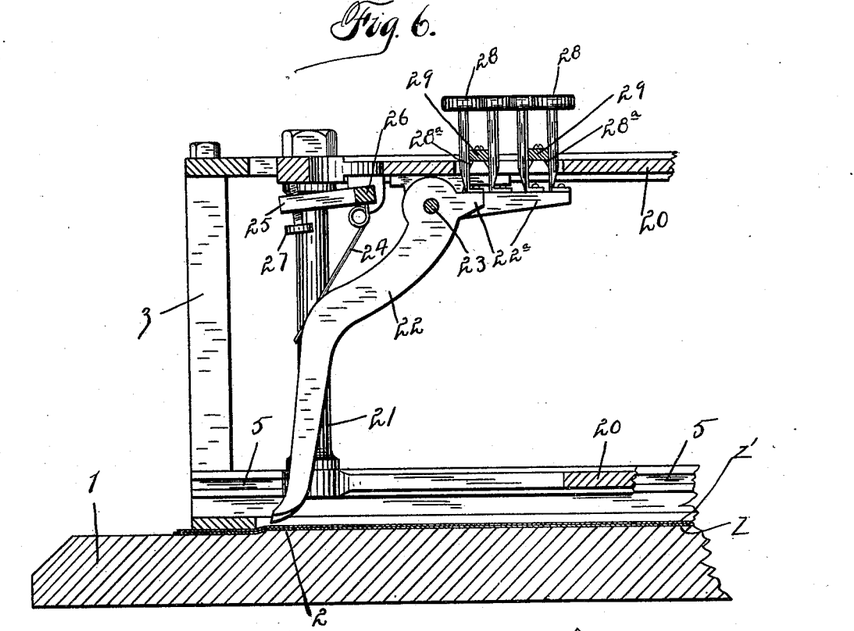
Fig. 6 is a vertical section on the line $x^6\ x^6$ of Fig. 2, some parts being broken away and others being removed.
Figure 10:
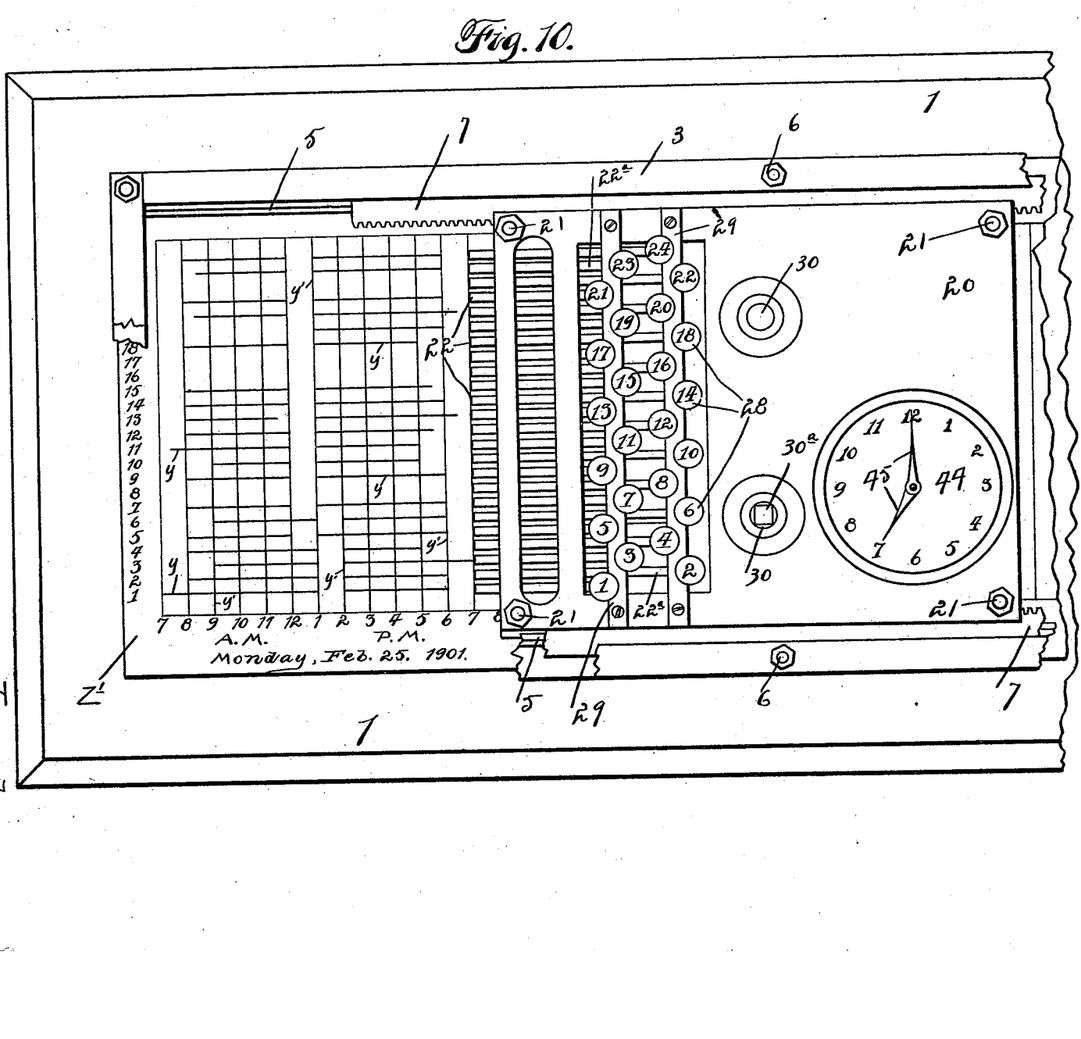
Fig. 10 is a view, partly in plan and with parts broken away, showing the machine with the carriage in the position in which it will stand after having traveled for twelve hours.
Figure 11:
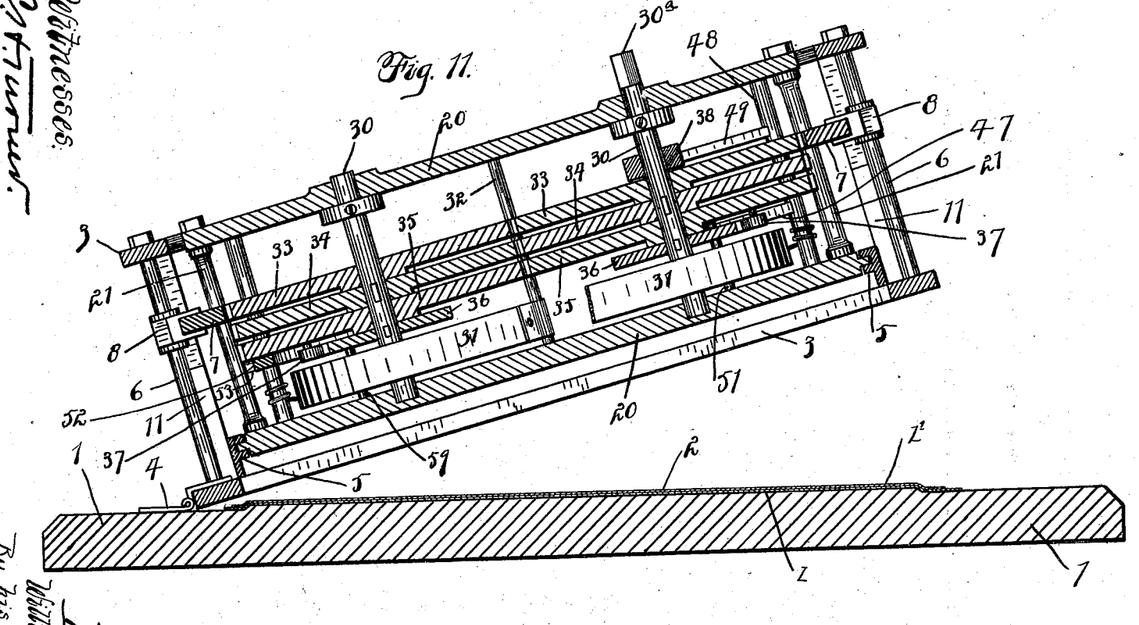
Fig. 11 is a transverse vertical section on the line $x^{11}\ x^{11}$ of Fig. 4, showing the hinged frame 3 as raised.

The numeral 3 indicates a rectangular skeleton framework made up of vertical corner-posts and horizontal side and end rails. This frame 3 is pivoted or hinged at one side to the bed-plate 1 by means of a plurality of hinges 4, which permit the said frame 3 to be raised at one side, so as to afford access to the platen 2. The lower longitudinally-extended rails of the frame 3 are grooved to afford longitudinally-extended guides or runways 5 for the traveling carriage, presently to be noted. The four bottom rails of the said hinged frame 3 normally press against or lie close to the bed-plate 1, immediately surrounding the slightly-raised platen 2. Upon the face of the platen is placed a sheet of carbon paper $z$ and a graduated record-strip $z'$, as best shown in Figs. 6, 10, and 11. The edges of the carbon $z$ and recording-strip $z'$ project beyond the platen 2 and are adapted to be clamped and held by the lower end and side bars of the frame 3. In this way the recording-strip and the carbon are securely held when the frame 3 is turned down into an operative position and are quickly released, so that they may be readily removed when the said frame is turned upward, as shown in Fig. 11.

Figures 1, 2:
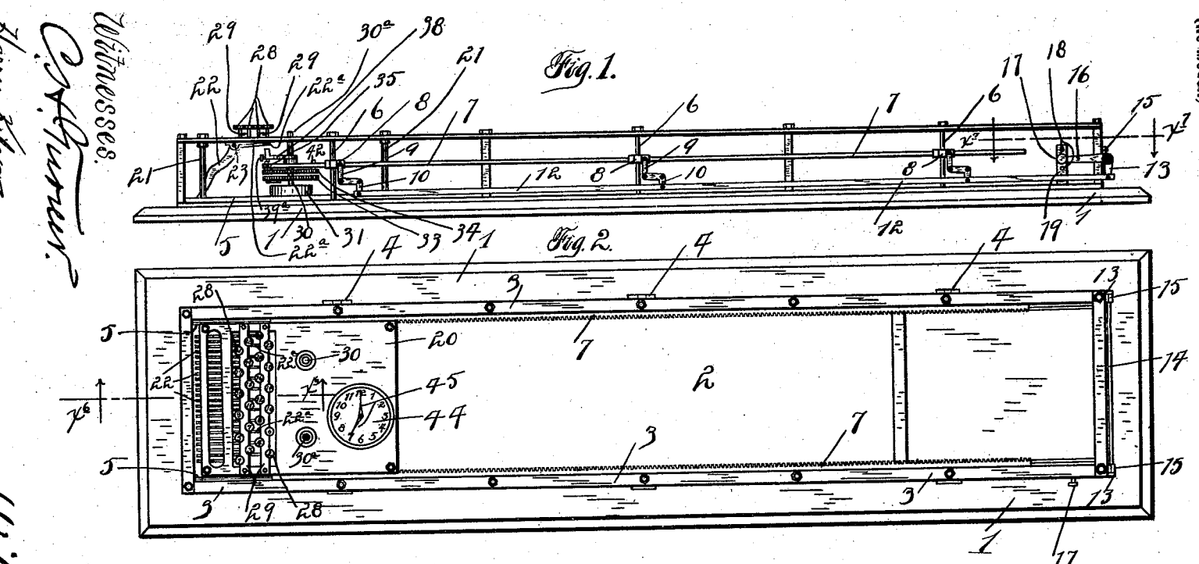
Figure 1 is a side elevation of a recorder embodying the several features of my invention.
Fig. 2 is a plan view of the same.
Figure 4:
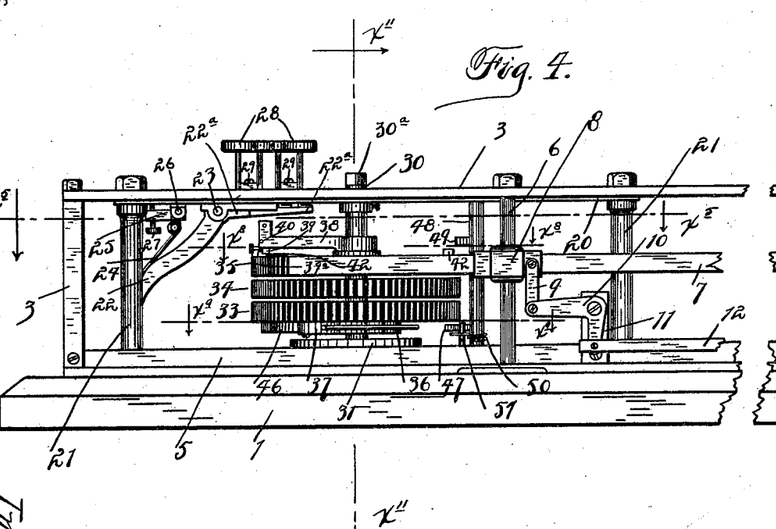
Fig. 4 is a side elevation showing the recorder on a larger scale than in Figs. 1 and 2, some parts being broken away.
Figure 7:
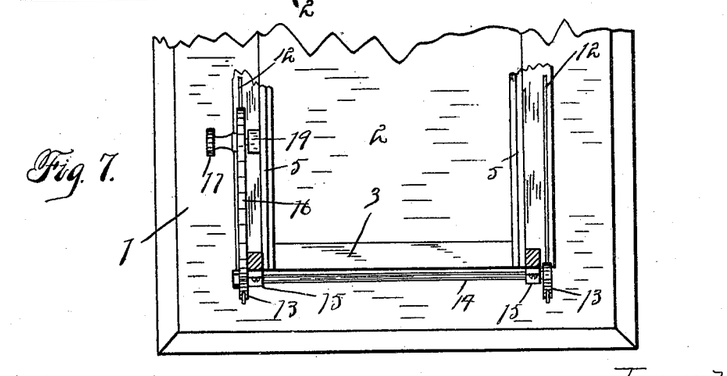
Fig. 7 is a horizontal section taken approximately on the line $x^7 x^7$ of Fig. 1, parts being broken away.

The longitudinally-extended top and bottom rails of the frame 3 are tied together at their intermediate portions by vertically-extended bolts or rods 6. On each side of the frame 3 is a longitudinally-extended rack 7, provided with keeper-brackets 8, which work loosely on the bolts or rods 6 and adapt the said racks to be adjusted vertically. To impart simultaneous and equal vertical movements to the two racks and to always maintain the same horizontal or parallel to an original position, the said racks are each connected, as shown, by links 9 to a plurality of bell-cranks 10, pivoted on projections 11 of the frame 3. The bell-cranks at a given side of the frame 3 are connected to a common link or rod 12. The two rods 12 are connected to the depending arms 13 of a transversely-extended rock-shaft 14, mounted in suitable bearings 15 on one end of the frame 3. At one end the rock-shaft 14 is provided with an arm 16, by means of which it may be operated. At its free end the operating-arm 16 is provided with a headed lock-pin 17, which, as shown, is engageable with any one of three perforations 18 of a post 19, rigidly secured on one side of the frame 3, as best shown in Figs. 1, 4, and 7. By means of the connections just described, the two racks 7 may be set in any one of three different positions, for a purpose which will hereinafter appear.

The traveling carriage is made up principally of top and bottom plates 20 and vertical tie-bolts or corner-posts 21. The bottom plate 20 is extended at its sides and fits into the guide-grooves 5 of the lower longitudinally-extended rails of the frame 3, as best shown in Figs. 5 and 11. In this way the carriage is mounted to move longitudinally of the frame 3 and over the platen and record-strip $z'$.

The plurality of markers, which are in the form of fingers 22, are located side by side and are pivoted at 23 to the rear portion of the upper plate 20 of the carriage, as best shown in Fig. 6. These marking-fingers 22 are subject to light springs 24, secured on a common pivoted support 25, which is shown as pivoted at 26 to lugs depending from the top plate 20 of the carriage and is adapted to be adjusted to simultaneously vary the tension of all of the springs 24 by means of an adjusting-screw 27. At its upper pivoted end each marking-finger 22 is provided with a short projection $22^a$, varying in length in different fingers. To each finger projection $22^a$ is secured the lower spring end of an operating-key 28. The stems of the keys 28 work upward through suitable perforations in the top plate 20 of the carriage, and each is provided with a lateral projection or lug $28^a$, which by lateral movements of the key 28 is adapted to be engaged and disengaged with a coöperating lock-bar 29, of which bars there are two, fixed on the top plate 20 of the carriage.

Normally the lugs $28^a$ of the keys 28 are engaged with the bars 29, as shown in Fig. 6, and the marking-fingers 22 are then positively held in inoperative positions. When, however, by lateral movements of said keys the said lugs are released from said bars, the springs 24 will throw the free ends of the released marking-fingers into contact with the upper surface of the recording-strip $z'$, so that under the traveling movement of the carriage the carbon $z$, coöperating with the said marking-fingers, will produce a mark indicating by its length the length of time during which the said marking-fingers are operative.

Figure 8:
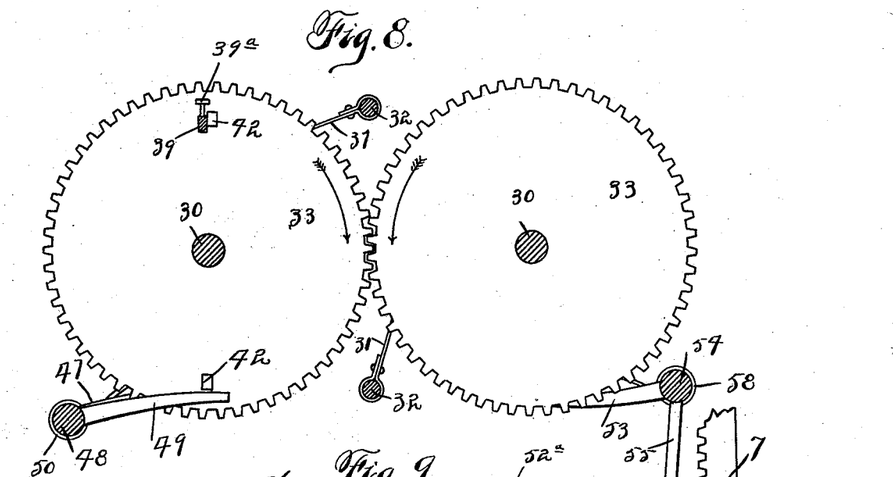
Fig. 8 is a detail in horizontal section, taken approximately on the line $x^8\ x^8$ of Fig. 4, showing the parts in their normal or starting position and corresponding in this respect to Figs. 1, 2, and 4.
Figure 8A:
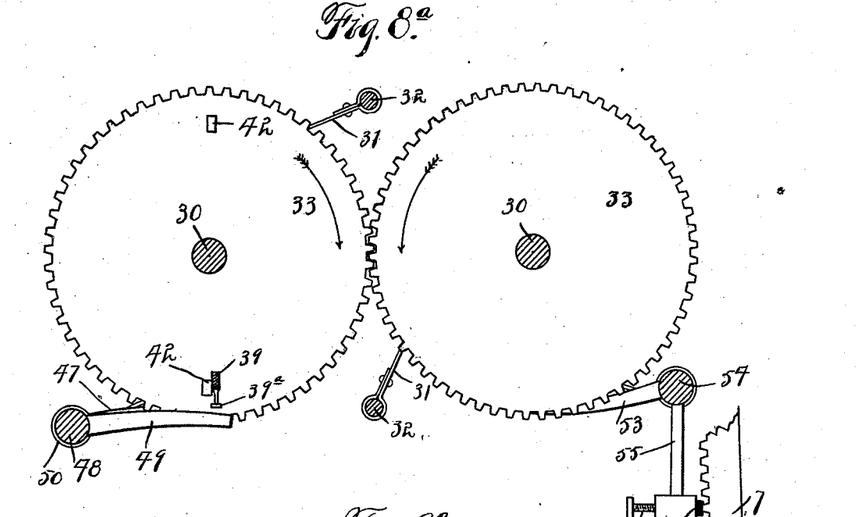
Figure 9:
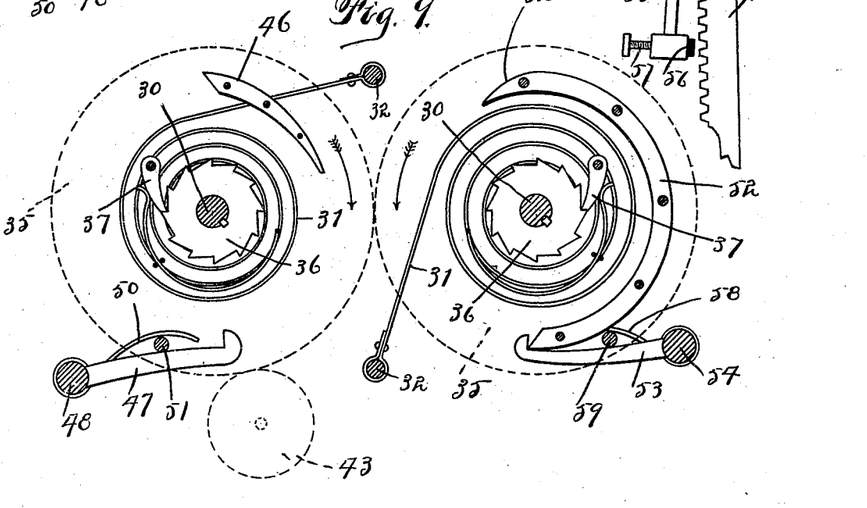
Fig. 9 is a horizontal section taken approximately on the line $x^9\ x^9$ of Fig. 4 and illustrating the parts in their normal positions. Figs. $8^a$ and $9^a$ are horizontal sections corresponding, respectively, to Figs. 8 and 9, but showing the parts in the positions in which they will stand after the carriage has traveled for twelve hours.
Figure 9A:
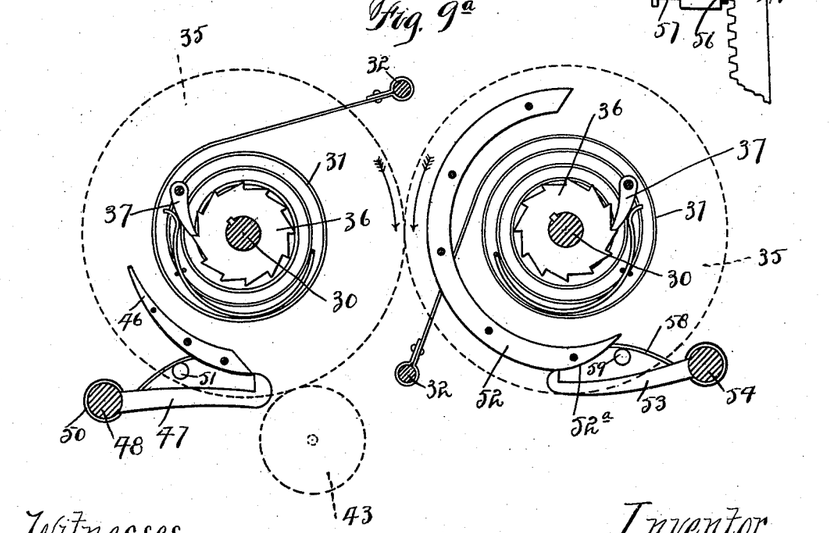

Suitably journaled in the top and bottom plates of the traveling carriage is a pair of motor-shafts 30, which are put under tension to turn in the direction indicated by the arrows on Figs. 5, 8, 9, $8^a$, and $9^a$ from strong coiled springs 31, secured thereto at one end and to posts 32 at their other ends, which posts are secured to the top and bottom plates of the carriage.

Figure 3:
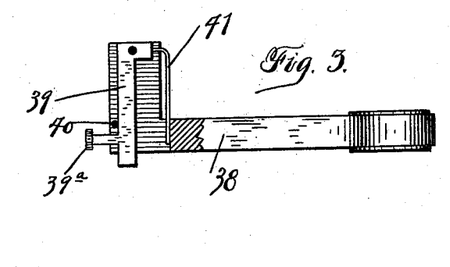
Fig. 3 is a detail in side elevation, some parts being broken away, showing the so-called "intermittent" driving-arm.

On the motor-shafts 30 are three pairs of intermeshing gears 33, 34, and 35, located the one pair above the other. The intermediate pair of gears 34 and the upper pair 35 are adapted to engage with the longitudinally-extended racks 7, and hence have the same pitch-circles and the same number of teeth. The lower gears 33 are shown as of the same pitch-circles, although this is not necessary, as these lower gears do not engage the said racks 7. The intermediate gears 34 are fixed or keyed to the respective shafts 30, while the upper and lower gears 33 and 35 are loose on the said shafts. Below the gears 33 each motor-shaft 30 has keyed or fixed to it a small ratchet-wheel 36, with which a spring-pressed pawl 37 on the gear 33 which stands immediately above the same coöperates as a driven member. One of the motor-shafts 30 just above the coöperating upper gear 35 is provided with an intermittently-operating driving-arm 38. (Shown in Figs. 1, 4, and 5 and in detail in Fig. 3.) This arm 38 is keyed or otherwise rigidly secured to the said shaft 30 and moves continuously therewith. At its free end this driving-arm 38 is bifurcated and is provided with a skip-pawl 39, which is yieldingly held in its normal position against a stop 40 by a spring 41. The skip-pawl 39 is provided with a projection 39$^a$, which is adapted to be struck by a so-called "trip-finger" presently to be noted. The upper gear 35, which is directly under the driving-arm 38, is provided with a pair of diametrically opposite lugs or projections 42, both of which lie in the normal path of the depending end of the skip-pawl 39.

With the construction so far described it is evident that under the tension of the motor-springs 31, acting through the gears 34 and 35, the carriage is put under strain to move from its normal position (indicated in Figs. 1 and 2) toward the opposite end of the platen 2. This movement of the carriage is restrained and properly timed by a suitable clock mechanism having, of course, an escapement device, which clockwork is indicated in the drawings as an entirety by the numeral 43. This clockwork is best shown in Fig. 5, wherein the wheels of the same, except the wheel 43$^a$, are indicated by dotted lines. The said wheel 43$^a$ meshes with one of the pair of lower wheels 33, already described, and the clockwork acting through this wheel 43$^a$ restrains the movement of the wheels 33 and through the coöperating ratchet-wheels 36 and pawls 37 holds back the motor-shafts 30. This action is best illustrated in Figs. 9 and 9$^a$, wherein the pinion 43$^a$, as well as the gears 33, are indicated by dotted lines. The clockwork illustrated also involves an exposed dial 44 and hands 45, which dial is located on top of the upper plate 20 of the carriage. As this clockwork may be of any suitable construction, further illustration thereof is not deemed necessary. In this preferred construction the gear 33, which stands under the gear 35, which carries the lugs 42, is provided on its under side with a trip-cam 46. This trip-cam 46 acts on the free end of an arm 47, which is carried by a short vertical rock-shaft 48, mounted in the top and bottom plates 20 of the traveling carriage. This rock-shaft 48 carries a trip-arm 49, the free end of which normally stands in the path of movement of the projection 39$^a$ of the skip-pawl 39, which, it will be remembered, is carried at the free end of the driving-lever 38. A spring 50 yieldingly holds the trip-arm 49 in its normal position and the lower arm 47 against the stop 51, as best shown in Figs. 8 and 9. The other gear 33 is provided on its under face with a cam 52, which extends concentric to the axis of said gear throughout approximately one hundred and eighty degrees, but is beveled at its forward end, as shown at 52$^a$. The cam 52 acts upon the free end of an arm 53, which is carried by a short vertical rock-shaft 54, mounted in the top and bottom plates 20 of the traveling carriage. The rock-shaft 54 carries a locking-arm 55, in the head of which is adjustably mounted a lock-block 56, preferably of rubber or leather. A screw 57 in the head of said lever 55 serves to project the block 56 more or less, as may be desired. A spring 58 normally holds the locking-arm 55 in an inoperative position and the arm 53 against a stop 59, projecting from the carriage-frame.

Operation: We will first consider the operation of the register when the parts are adjusted as shown in the drawings—that is, with the racks 7 engaged with the upper wheels 35. When the clockwork is started to run at seven o'clock of the first day, which we will assume to be Monday morning, the parts stand as indicated in Figs. 1, 2, 5, 6, 8, and 9. During the first twelve hours of movement the skip-pawl 39 of the driving-arm 38 will keep engagement with the lug 42 on the coöperating gear 35, with which it originally stood engaged, and will impart to the two gears 35 half-rotations. This movement of the gears 35 will cause the traveling carriage 20 21 to move a distance which on the graduated record-strip is indicated as twelve hours. This position is shown in Fig. 10, and the corresponding positions of certain other parts are, as already stated, indicated in Figs. 8$^a$ and 9$^a$. The gears 33, as already stated, are driven from the ratchet-wheels 36, and they in turn, under the control of the clockwork, hold back the motor-shafts and other parts driven thereby. When the gears 33 have reached the position indicated in Fig. 9$^a$, the trip-cam 46, acting on the arm 47, has forced the trip-arm 49 out of the path of the projection 39$^a$ of the skip-pawl 39, as shown in Fig. 8$^a$. At approximately the same time or an instant later the trip-cam 46 will pass out of contact with the arm 47, and the spring 50 being released will throw the free end of the trip-arm 49 against the projection 39$^a$, thereby causing the said skip-pawl to clear the lug 42, with which it has for the past twelve hours been engaged, and pass on by the same. Hence during the next twelve hours and until the said skip-pawl reaches engagement with the diametrically opposite lug 42 the two gears 35 will stand idle and the carriage 20 21 will remain stationary. During this twelve hours the cam 52, acting on the arm 53, forces the block 56 of the locking-lever 55 into tight engagement with the teeth of the adjacent rack 7, and thereby positively locks the carriage against accidental movements. By adjustments of the screw 57 the block 56 is so set for engagement with the teeth of the rack that the friction due to the reacting pressure of the lever 53 against the cam 52 will equal or approximately equal the force required to move the carriage. In this way the accurate running of the clockwork throughout the twenty-four hours of each day is maintained.

The machine illustrated is designed to run intermittently, as above described—that is, for twelve hours of each day for the six consecutive working days of a week. From what has already been said in the early part of this description the manner in which the marking-fingers are thrown into and out of action by the keys 29 should be well understood. It is here simply repeated that the marking fingers or devices are thrown into action by releasing the keys and are thrown out of action by depressing the same.

The ruling and markings on the record strip or sheet are indicated only in Fig. 10, wherein the lines marked $y$ are the lines made by the marking devices. The transverse lines $y'$ indicate hours of time, and in practice intervening lines would usually be employed to indicate fractions of hours. As the record strip or sheet is transparent, the lines $y$ made thereon by the travel of the markers over the said record-strip and carbon are plainly visible from the upper surface of the record-strip.

When the racks 7 are moved into engagement with the intermediate gears 34, the carriage will be caused to travel continuously throughout the twenty-four hours of the day, and with the device illustrated the carriage would run for but three days without resetting. As is obvious, the platen and guides and racks might be extended so that the carriage would run for a longer time. The racks 7 are moved into engagement with the intermediate gears 34 by movement of the lever 16 into its lower position, in which position the lock-pin 17 is engaged with the lowermost perforation 18 of the post 19.

When the lever 16 is thrown into its uppermost position, the pin 17 may be engaged with the uppermost perforation 18 of said post 19, and in this position the racks 7 are moved above the upper gears 35, and the carriage may then be freely run from one end to the other of its runways or guides.

The motor-springs 31 may be wound up by applying a suitable key (not shown) to the squared upper end 30ᵃ of one of the motor-shafts 30, under which winding action the ratchet-wheels 36 slip under the coöperating pawls 37, so that the lower gears 33, which are geared with the clockwork, are not moved backward.

When the racks 7 are engaged with the intermediate gears 34, the motor-springs 31 will be wound up by the simple act of returning the carriage to its normal or starting position.

At the end of the week, or at the end of the period of days for which the device is set to run, the carriage will of course stand at the extreme foot end of the frame 3 and platen 2. The carriage will usually be returned to its normal or starting position at 7 o'clock a. m. of the first day of the week. If, however, the carriage should not be returned to its starting position until 7.30 a. m., for instance, the carriage should not be moved to its extreme starting position, but should be moved only far enough to register the marking ends of the marking-fingers with the line or position on the recording strip or sheet indicating 7.30.

It will of course be understood that the invention above described is capable of many modifications. While I consider the traveling carriage as a feature broadly new, it would, nevertheless, be within the scope of my invention, although not the full equivalent of the construction wherein the traveling carriage is employed, to make the parts corresponding to the carriage stationary and to provide a flat or extended platen capable of being always kept completely in view and to move the said platen. In short, I believe I am the first to provide a time-recorder in which the complete record may be always exposed to view—that is, kept in a position where it may be inspected while the machine is in action.

In some cases the so-called "carriage" or support for the marking devices will be made stationary, and the platen will be given a movement. This latter construction would probably be employed in very large machines, while the traveling carriage and fixed platen would be employed in small and medium-sized machines. The traveling carriage has many advantages over the movable platen, and the one is not the full equivalent of the other.

What I claim, and desire to secure by Letters Patent of the United States, is as follows:

1. The combination with a record-supporting platen so extended that its entire record-supporting surface may be seen, of a carriage or support, means for moving one of said parts with a timed action, and a plurality of independent markers mounted on said carriage or support and operative at will, which markers are so disposed that they always stand entirely clear of the record, thereby leaving the entire record exposed to view, substantially as described.

2. The combination with a substantially flat platen and a carriage or support, of means for moving one of the said parts with a timed action, independent markers on said support, and means for holding the record-strips on said platen, substantially as described.

3. The combination with a platen and a carriage or support, the one movable with respect to the other, of a rack connected to said platen, a gear on said support meshing with said rack, automatic means for intermittently moving said gear with a timed action, and marking devices on said carriage or support, substantially as described.

4. The combination with a platen and a carriage or support, of a rack connected to said platen, a gear on said support meshing with said rack, a spring-motor on said support, a rotating driver subject to said motor, a skip-pawl on said driver, engageable with driving projections movable with said gear, and a timed trip for rendering the driving action of said skip-pawl intermittent, substantially as described.

5. The combination with a platen and a carriage or support, the one movable with respect to the other, means for timing the action of the movable member and intermittently moving the same, involving an escapement, a spring-motor and a skip-pawl connection between said motor and driven member, and independent markers on said carriage or support, substantially as described.

6. The combination with a platen, of a carriage mounted to move over the same, means for moving said carriage with a timed action, and independent markers on said carriage, substantially as described.

7. The combination with a platen and means for securing a record-strip thereon, a carriage-guide, a traveling carriage movable on said guide over said platen, independent markers on said carriage, and means for moving said carriage with a timed action, substantially as described.

8. The combination with a platen and means for securing a record-strip thereon, of a carriage-guide, a carriage movable on said guide over said platen, means for moving said carriage intermittently and with a timed action, and markers on said carriage, substantially as described.

9. The combination with a platen and a graduated record-strip securable upon said platen, of a carriage-guide, a carriage movable on said guide over said record-strip, independent markers on said carriage, and means for moving said carriage at a rate of speed corresponding to that indicated on said record-strip, substantially as described.

10. The combination with a platen and a carriage-guide, of a traveling carriage movable on said guide, independent markers on said carriage, a spring-motor for moving said carriage, and an escapement controlling said motor and a timed mechanism for regulating the speed of said carriage, substantially as described.

11. The combination with a platen and a carriage or support, of means for moving one of said parts with respect to the other with a timed action, means for positively and intermittently intercepting the movement of said movable member, and independent markers on said support, substantially as described.

12. The combination with a platen and a carriage-guide, of a traveling carriage movable on said guide, a motor for moving said carriage, a lock for said carriage operated intermittently and with a timed action, and independent markers on the said carriage, substantially as described.

13. The combination with a platen and a carriage or support, of a constantly-running motor for moving one of said parts with respect to the other, a trip for intermittently throwing said motor out of action on the movable member, a lock for intermittently securing the movable member, and independent markers on said carriage or support, substantially as described.

14. The combination with a platen and a carriage-guide, of independent markers on said carriage, a constantly-running spring-motor on said carriage for driving the same, driving-wheels subject to said motor, a trip for throwing said motor out of action on said driving-wheels, a resistance device arranged to be thrown into action on said motor when said motor is thrown out of action, which resistance device offers a resistance to the movement of said motor approximately equal to that required to drive the carriage or movable member.

15. The combination with a flat, relatively fixed platen and carriage-guide connected therewith, of a pair of racks fixed against endwise movement with respect to said platen, a traveling carriage movable on said guide, a pair of intermeshing gears meshing with said racks, one thereof having a pair of driving-lugs, a spring-motor actuating said gears, means for restraining the movements of said motor, involving an escapement, and a motor-driven skip-pawl intermittently engageable with said driving-lugs, substantially as described.

16. The combination with a platen and a carriage or support and means for moving the one with respect to the other with a timed action, of markers on said carriage or support, and a carbon and a record-strip securable on the face of said platen for coöperation with said markers, substantially as described.

17. The combination with a platen and a carriage or support, the one movable with respect to the other, independent markers on said support movable over said platen, a rack mounted on said platen, a pair of gears located one over the other on said support, means for engaging said rack with either of said gears, means for driving one of said gears continuously, and means for driving the other of said gears intermittently, and both with properly-timed actions, substantially as described.

18. The combination with a relatively fixed platen and a traveling carriage, of a pair of vertically-adjustable racks, two pairs of gears on said carriage, means for adjusting said racks into engagement with either of said pairs of gears, a spring-motor acting constantly on one of said pairs of gears, means for automatically and intermittently rendering said motor operative on the other pair of said gears, and a clockwork or escapement mechanism restraining the action of said motor, substantially as described.

19. The combination with the relatively fixed platen and traveling carriage, of a pair of vertically-adjustable racks extending lengthwise of the path of movement of said carriage, two pairs of gears mounted one over the other on said carriage, means for moving said racks into mesh with either pair of said gears, independent marking devices on said carriage, a spring-motor acting constantly on one of said pair of gears, driving-lugs 42 on one member of the other pair of gears, a constantly-driven arm or driver 38, provided at its free end with a skip-pawl 39 engageable intermittently with said lugs 42, the vibrating trip-arm 49 for action on said skip-pawl, and a cam or trip 46 mounted to rotate with said driver 38 and controlling the tripping movements of said arm 49, substantially as described.

In testimony whereof I affix my signature in presence of two witnesses.

WILLIAM P. GURR.

Witnesses:
M. M. McGRORY,
F. D. MERCHANT.